US011366962B2

(12) United States Patent
Sanyasi et al.

(10) Patent No.: US 11,366,962 B2
(45) Date of Patent: Jun. 21, 2022

(54) METHOD AND APPARATUS FOR TEMPLATE AUTHORING AND EXECUTION

(71) Applicant: JPMorgan Chase Bank, N.A., New York, NY (US)

(72) Inventors: Laxman Sanyasi, Hilliard, OH (US); Mahesh Madhusudan, Dublin, OH (US)

(73) Assignee: JPMORGAN CHASE BANK, N.A., New York, NY (US)

(*) Notice: Subject to any disclaimer, the term of this patent is extended or adjusted under 35 U.S.C. 154(b) by 136 days.

(21) Appl. No.: 16/990,549

(22) Filed: Aug. 11, 2020

(65) Prior Publication Data

US 2022/0050960 A1     Feb. 17, 2022

(51) Int. Cl.
*G06F 40/186* (2020.01)
*G06F 21/44* (2013.01)
*G06F 16/13* (2019.01)

(52) U.S. Cl.
CPC .......... *G06F 40/186* (2020.01); *G06F 16/137* (2019.01); *G06F 21/44* (2013.01)

(58) Field of Classification Search
None
See application file for complete search history.

(56) References Cited

U.S. PATENT DOCUMENTS

2006/0294459 A1* 12/2006 Davis .................... G06F 40/166
                                                          715/239
2019/0286896 A1*  9/2019 Wyle .................... G06V 30/416

* cited by examiner

*Primary Examiner* — Tuan S Nguyen
(74) *Attorney, Agent, or Firm* — Greenblum & Bernstein, P.L.C.

(57) ABSTRACT

Various methods, apparatuses/systems, and media for real-time template authoring and execution are provided. A receiver receives a request to create a real-time document template. A processor implements a template authoring work flow process by leveraging native tools to create the real-time document template based on the received request; creates a real-time document based on the real-time document template; triggers an automatic verification process or a manual verification process in response to creating the real-time document; and validates the real-time document for execution after completing the automatic verification process or the manual verification process.

18 Claims, 13 Drawing Sheets

FIG. 6

METHOD AND APPARATUS FOR TEMPLATE AUTHORING AND EXECUTION

TECHNICAL FIELD

This disclosure generally relates to document template authoring and execution, and, more particularly, to methods and apparatuses for implementing a real-time template authoring module for providing a true real-time end-to-end document life-cycle management solution allowing real-time template composition, real-time document manipulation, automatic quality control, etc., thereby improving timeliness, completeness, and accuracy of generating a real-time document (e.g., a sworn document).

BACKGROUND

A sworn document is one of the legal documents between customers and an organization, such as J.P. Morgan and Chase (JPMC). Currently, conventional document tracking systems may implement automated information technology (IT) solutions, which may be built on a third party vendor product to manage the inventory template and execution of a sworn document across multiple lines of business (LOB) within a firm. However, conventional document tracking systems lack capabilities to support, among others: real-time inventory template authoring and legal review/approval process; reject duplicate template authoring for productivity management; real-time template composition; real-time document manipulation capabilities such as composition, extraction, soft redaction, hard redaction, sworn document packaging/merging multiple documents, bar-coding; systemically capturing evidence as a PDF document for verification of facts, etc.

SUMMARY

The present disclosure, through one or more of its various aspects, embodiments, and/or specific features or sub-components, may provide, among others, various systems, servers, devices, methods, media, programs, and platforms for implementing a real-time template authoring module for providing a true real-time end-to-end document life-cycle management solution allowing real-time template composition, real-time document manipulation, automatic quality control, etc., thereby improving timeliness, completeness, and accuracy of generating a real-time document (e.g., a sworn document), but the disclosure is not limited thereto. For example, the present disclosure, through one or more of its various aspects, embodiments, and/or specific features or sub-components, may further provide, among others, various systems, servers, devices, methods, media, programs, and platforms for implementing a real-time template authoring module for supporting: real-time inventory template authoring and legal review/approval process; rejecting duplicate template authoring for productivity management; real-time template composition; real-time document manipulation capabilities such as composition, extraction, soft redaction, hard redaction, sworn document packaging/ merging multiple documents, bar-coding; systemically capturing evidence as a PDF document for verification of facts; automatic quality checking; etc., but the disclosure is not limited thereto.

According to an aspect of the present disclosure, a method for real-time template authoring and execution by utilizing one or more processors and one or more memories is disclosed. The method may include: receiving a request to create a real-time document template; implementing a template authoring work flow process by leveraging native tools to create the real-time document template based on the received request; creating a real-time document based on the real-time document template; triggering an automatic verification process in response to creating the real-time document, wherein the automatic verification process includes: verifying content data of the created real-time document with pre-stored reference content data; generating a confidence index value based on verifying the content data of the real-time document with pre-stored reference content data, wherein the confidence index value represents a degree of matching of the content data of the real-time document to the pre-stored reference content data; and completing the automatic verification process when it is determined that the confidence index value corresponds to an exact match of the content data of the real-time document to the pre-stored reference content data; and validating the real-time document for execution after completing the automatic verification process.

According to another aspect of the present disclosure, the method may further include: triggering a manual quality check process to manually verify the content data of the real-time document and the pre-stored reference content data when it is determined that the confidence index value does not correspond to an exact match of the content data of the real-time document to the pre-stored reference content data; and validating the real-time document after completing the manual quality check process.

According to yet another aspect of the present disclosure, the real-time document may be a sworn document requiring execution by an authorized user after validation, but the disclosure is not limited thereto.

According to further aspect of the present disclosure, wherein the real-time document template may be in .pdf and/or .docx file format, but the disclosure is not limited thereto.

According to yet another aspect of the present disclosure, the method may further include: integrating the template authoring workflow process into a system that is configured to track and manage sworn documents across multiple lines of business (LOB).

According to an additional aspect of the present disclosure, the method may further include: integrating mainframe screens into the system; and automatically populating account information based on an account that a user log in information into the system.

According to yet another aspect of the present disclosure, the method may further include: building an intelligent self-managed place-holder data dictionary used in the real-time document template during authoring of the real-time document template.

According to another aspect of the present disclosure, the method may further include: calculating a hash value of template content of the created template; storing the hash value onto a database; receiving a request for creating a new real-time document template; calculating a hash value of the new real-time document template request; comparing the hash value of the new real-time document template request with the stored hash value by accessing the database; generating a positive validation result of validating the hash value of the new real-time document template request when it is determined that the hash value of the new real-time document template request is different from the stored hash value; and initiating a new template authoring work flow process to create the new real-time document template based on the positive validation result.

According to a further aspect of the present disclosure, the method may further include: calculating a hash value of template content of the created template; storing the hash value onto a database; receiving a request for creating a new real-time document template; calculating a hash value of the new real-time document template request; comparing the hash value of the new real-time document template request with the stored hash value by accessing the database; generating a negative validation result of not validating the hash value of the new real-time document template request when it is determined that the hash value of the new real-time document template request is the same as the stored hash value; and rejecting the request to create the new real-time document template based on the negative validation result.

According to yet another aspect of the present disclosure, the template authoring work flow process may provide real-time document management capabilities that includes one or more of the following document-based capabilities: composition, extraction, soft redaction, hard redaction, splitting or merging of pages, document packaging, and bar coding, but the disclosure is not limited thereto.

According to a further aspect of the present disclosure, the method may further include: implementing an optical character recognition (OCR) processing and application programming interfaces (APIs) for document generation, conversion, and automation; and automatically controlling quality of the created real-time document based on the OCR processing and the APIs.

According to another aspect of the present disclosure, a system for real-time template authoring and execution is disclosed. The system may include a receiver configured to receive a request to create a real-time document template; a processor; and a database operatively connected to the processor and the receiver via a communication network. The processor may be configured to: implement a template authoring work flow process by leveraging native tools to create the real-time document template based on the received request; create a real-time document based on the real-time document template; trigger an automatic verification process in response to creating the real-time document, wherein the automatic verification process may include: verifying content data of the created real-time document with pre-stored reference content data; generating a confidence index value based on verifying the content data of the real-time document with pre-stored reference content data, wherein the confidence index value represents a degree of matching of the content data of the real-time document to the pre-stored reference content data; and completing the automatic verification process when it is determined that the confidence index value corresponds to an exact match of the content data of the real-time document to the pre-stored reference content data. The processor may also be configured to validate the real-time document for execution after completing the automatic verification process.

According to further aspect of the present disclosure, the processor may be further configured to: trigger a manual quality check process to manually verify the content data of the real-time document and the pre-stored reference content data when it is determined that the confidence index value does not correspond to an exact match of the content data of the real-time document to the pre-stored reference content data; and validate the real-time document after completing the manual quality check process.

According to an additional aspect of the present disclosure, the processor may be further configured to: integrate the template authoring workflow process into a system that is configured to track and manage sworn documents across multiple lines of business (LOB).

According to yet another aspect of the present disclosure, the processor may be further configured to: integrate mainframe screens into the system; and automatically populate account information based on an account that a user log in information into the system.

According to another aspect of the present disclosure, the processor may be further configured to: calculate a hash value of template content of the created template; store the hash value onto a database; receive a request for creating a new real-time document template; calculate a hash value of the new real-time document template request; compare the hash value of the new real-time document template request with the stored hash value by accessing the database; generate a positive validation result of validating the hash value of the new real-time document template request when it is determined that the hash value of the new real-time document template request is different from the stored hash value; and initiate a new template authoring work flow process to create the new real-time document template based on the positive validation result.

According to an additional aspect of the present disclosure, the processor may be further configured to: calculate a hash value of template content of the created template; store the hash value onto a database; receive a request for creating a new real-time document template; calculate a hash value of the new real-time document template request; compare the hash value of the new real-time document template request with the stored hash value by accessing the database; generate a negative validation result of not validating the hash value of the new real-time document template request when it is determined that the hash value of the new real-time document template request is the same as the stored hash value; and reject the request to create the new real-time document template based on the negative validation result.

According to yet another aspect of the present disclosure, the processor may be configured to: implement an optical character recognition (OCR) processing and application programming interfaces (APIs) for document generation, conversion, and automation; and automatically control quality of the created real-time document based on the OCR processing and the APIs.

According to another aspect of the present disclosure, a non-transitory computer readable medium configured to store instructions for real-time template authoring and execution is disclosed. The instructions, when executed, may cause a processor to perform the following: causing a receiver to receive a request to create a real-time document template; implementing a template authoring work flow process by leveraging native tools to create the real-time document template based on the received request; creating a real-time document based on the real-time document template; triggering an automatic verification process in response to creating the real-time document, wherein the automatic verification process includes: verifying content data of the created real-time document with pre-stored reference content data; generating a confidence index value based on verifying the content data of the real-time document with pre-stored reference content data, wherein the confidence index value represents a degree of matching of the content data of the real-time document to the pre-stored reference content data; and completing the automatic verification process when it is determined that the confidence index value corresponds to an exact match of the content data of the real-time document to the pre-stored reference content data; and validating the real-time document for execution after completing the automatic verification process.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 illustrates an exemplary configurable table in creating a real-time document template in accordance with an exemplary embodiment.

DETAILED DESCRIPTION

Figure 1:
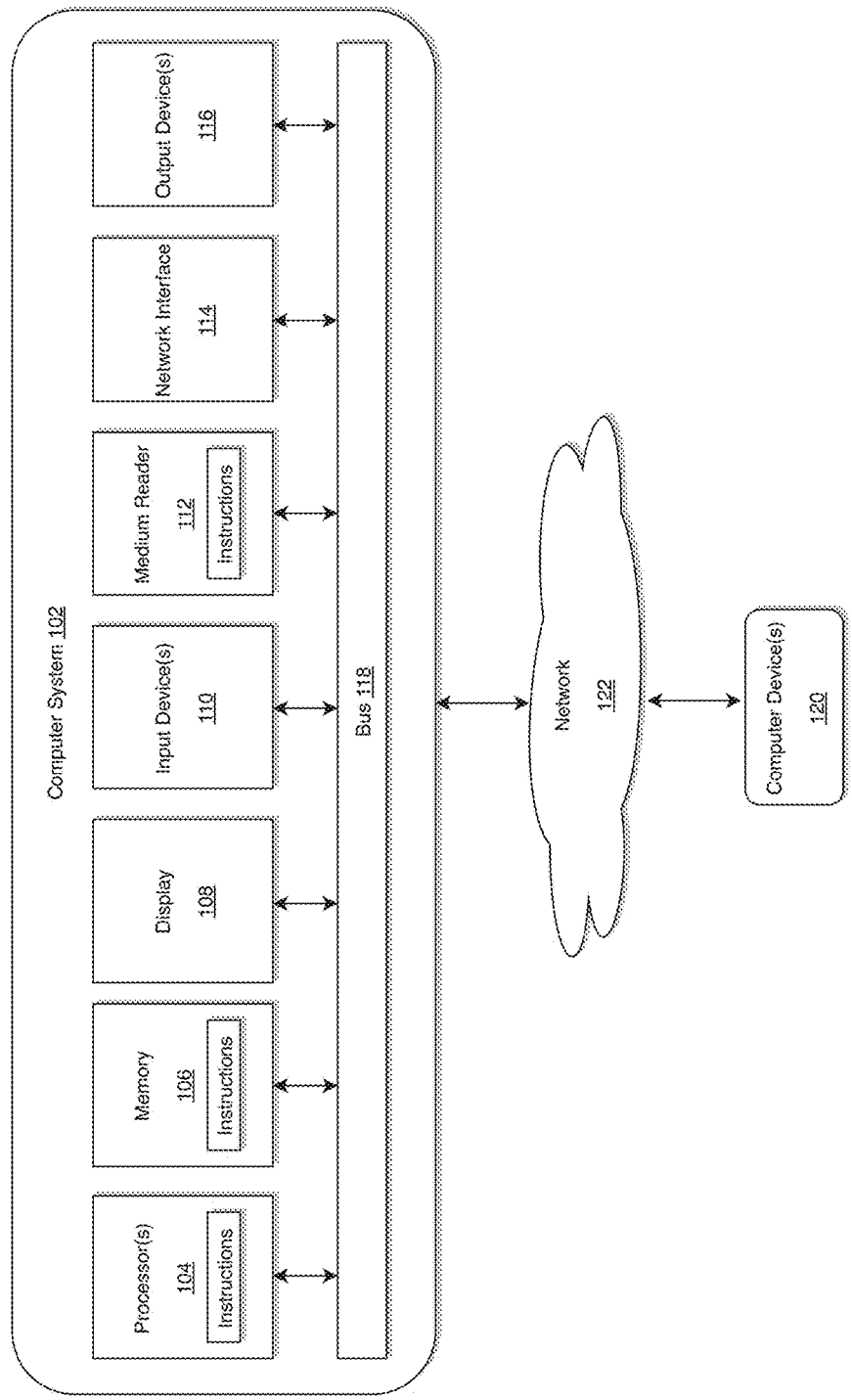
FIG. 1 illustrates a computer system for real-time template authoring and execution in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized processes of implementing a real-time template authoring module for providing a true real-time end-to-end document life-cycle management solution allowing real-time template composition, real-time document manipulation, automatic quality control, etc., thereby improving timeliness, completeness, and accuracy of generating a real-time document (e.g., a sworn document), but the disclosure is not limited thereto. As described herein, various embodiments may further provide optimized processes of implementing a real-time template authoring module for supporting: real-time inventory template authoring and legal review/approval process; rejecting duplicate template authoring for productivity management; real-time template composition; real-time document manipulation capabilities such as composition, extraction, soft redaction, hard redaction, sworn document packaging/merging multiple documents, bar-coding; systemically capturing evidence as a PDF document for verification of facts; automatic quality checking; etc., but the disclosure is not limited thereto.

Figure 2:
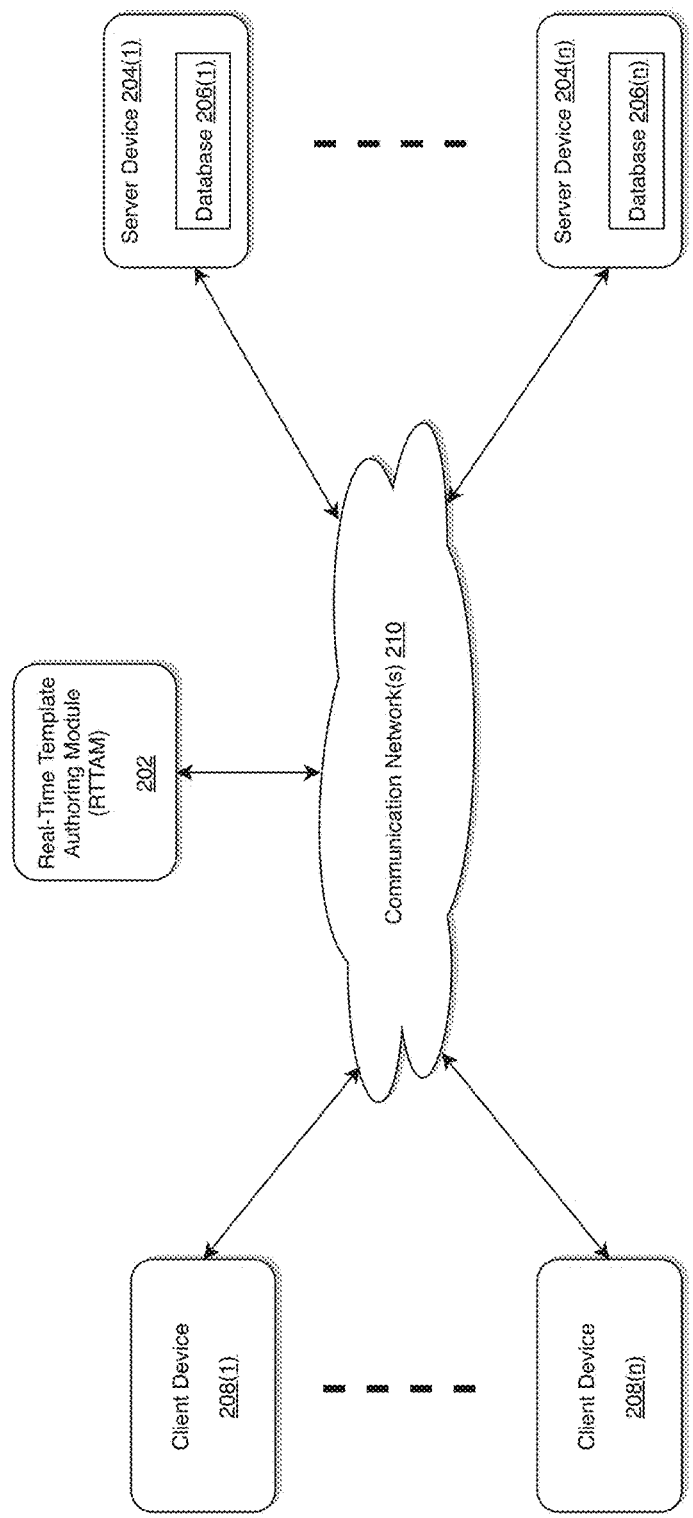
FIG. 2 illustrates an exemplary diagram of a network environment with a real-time template authoring module in accordance with an exemplary embodiment.

Referring to FIG. 2, a schematic of an exemplary network environment 200 for implementing a real-time template authoring module (RTTAM) of the instant disclosure is illustrated.

Conventional system, that does not implement an RTTAM of the instant disclosure, may not be able to automatically to support, among others: real-time inventory template authoring and legal review/approval process; reject duplicate template authoring for productivity management; real-time template composition; real-time document manipulation capabilities such as composition, extraction, soft redaction, hard redaction, sworn document packaging/merging multiple documents, bar-coding; systemically capturing evidence as a PDF document for verification of facts, etc.

According to exemplary embodiments, the above-described problems associated with conventional system may be overcome by implementing an RTTAM 202 as illustrated in FIG. 2 by providing a true real-time end-to-end document life-cycle management solution allowing real-time template composition, real-time document manipulation, automatic quality control, etc., thereby improving timeliness, completeness, and accuracy of generating a real-time document (e.g., a sworn document), but the disclosure is not limited thereto.

The RTTAM 202 may be the same or similar to the computer system 102 as described with respect to FIG. 1.

The RTTAM 202 may store one or more applications that can include executable instructions that, when executed by the RTTAM 202, cause the RTTAM 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RTTAM 202 itself, may be located in virtual server(s) running in a cloud-based computing environment rather than being tied to one or more specific physical network computing devices. Also, the application(s) may be running in one or more virtual machines (VMs) executing on the RTTAM 202. Additionally, in one or more embodiments of this technology, virtual machine(s) running on the RTTAM 202 may be managed or supervised by a hypervisor.

In the network environment 200 of FIG. 2, the RTTAM 202 is coupled to a plurality of server devices 204(1)-204(n) that hosts a plurality of databases 206(1)-206(n), and also to a plurality of client devices 208(1)-208(n) via communication network(s) 210. A communication interface of the RTTAM 202, such as the network interface 114 of the computer system 102 of FIG. 1, operatively couples and communicates between the RTTAM 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RTTAM 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like.

The RTTAM 202 may be a standalone device or integrated with one or more other devices or apparatuses, such as one or more of the server devices 204(1)-204(n), for example. In one particular example, the RTTAM 202 may be hosted by one of the server devices 204(1)-204(n), and other arrangements are also possible. Moreover, one or more of the devices of the RTTAM 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RTTAM 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the RTTAM 202 that may be configured for management of identified vulnerabilities that permits a threat management group to identify and track threats that may be particularly significant to its organization, thereby efficiently generating a list of prioritized remediation and interfacing with remediation resources so that remediation can be expedited and automatically implemented. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the RTTAM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the RTTAM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RTTAM 202, the server devices 204(1)-204(n), or the client devices 208(1)-208(n), for example, may be configured to operate as virtual instances on the same physical machine. For example, one or more of the RTTAM 202, the server devices 204(1)-204(n), or the client devices 208(1)-208(n) may operate on the same physical device rather than as separate devices communicating through communication network(s) 210. Additionally, there may be more or fewer RTTAMs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
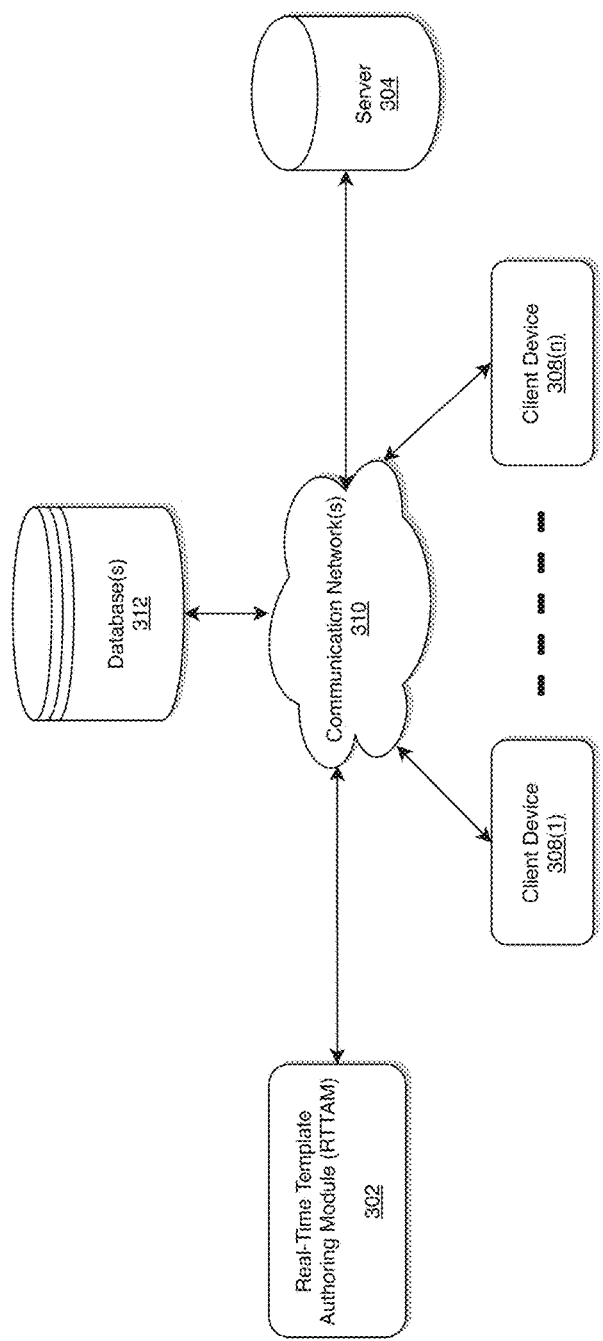
FIG. 3 illustrates a system diagram for implementing a real-time template authoring module in accordance with an exemplary embodiment.

FIG. 3 illustrates a system diagram for implementing a real-time template authoring module (RTTAM) in accordance with an exemplary embodiment.

As illustrated in FIG. 3, the RTTAM 302 may be connected to a server 304, and a database 312 via a communication network 310. The RTTAM 302 may also be connected to a first client device 308(1) and a second client device 308(n) via the communication network 310, but the disclosure is not limited thereto. According to exemplary embodiments, the RTTAM 302 may also include machine learning models (not shown) which may be trained using CPUs and GPUs, but the disclosure is not limited thereto.

According to exemplary embodiment, the system 300 is described and shown in FIG. 3 as including the RTTAM 302, although it may include other rules, policies, modules, databases, or applications, for example. According to exemplary embodiments, the database 312 may be embedded within the RTTAM 302. According to exemplary embodiments, the database 312 may be configured to store information including: rules and heuristics relating to real-time document template and real-time document; hash value of template content; pre-stored data content for verification purpose, etc., but the disclosure is not limited thereto.

According to exemplary embodiments, the RTTAM 302 may be configured to make domain specific optical character recognition corrections to the digitized data.

According to exemplary embodiments, the RTTAM 302 may be configured to receive continuous feed of data from the database 312 via the communication network 310.

As will be described below, the RTTAM 302 may be configured to: receive a request to create a real-time document template; implement a template authoring work flow process by leveraging native tools to create the real-time document template based on the received request; create a real-time document based on the real-time document template; trigger an automatic verification process or a manual verification process in response to creating the real-time document. The RTTAM 302 may further be configured to validate the real-time document for execution after completing the automatic verification process or the manual verification process. As will be described below, the automatic verification process implemented by the RTTAM 302 may include: verifying content data of the created real-time document with pre-stored reference content data; generating a confidence index value based on verifying the content data of the real-time document with pre-stored reference content data, wherein the confidence index value represents a degree of matching of the content data of the real-time document to the pre-stored reference content data; and completing the automatic verification process when it is determined that the confidence index value corresponds to an exact match of the content data of the real-time document to the pre-stored reference content data.

The first client device 308(1) and the second client device 308(n) are illustrated as being in communication with the RTTAM 302. In this regard, the first client device 308(1) and the second client device 308(n) may be "clients" of the RTTAM 302 and are described herein as such. Nevertheless, it is to be known and understood that the first client device 308(1) and/or the second client device 308(n) need not necessarily be "clients" of the RTTAM 302, or any entity described in association therewith herein. Any additional or alternative relationship may exist between either or both of the first client device 308(1) and the second client device 308(n) and the RTTAM 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either or both of the first client device 308(1) and the second client device 308(n) may communicate with the RTTAM 302 via broadband or cellular communication. Of course, these embodiments are merely exemplary and are not limiting or exhaustive.

Figure 4:
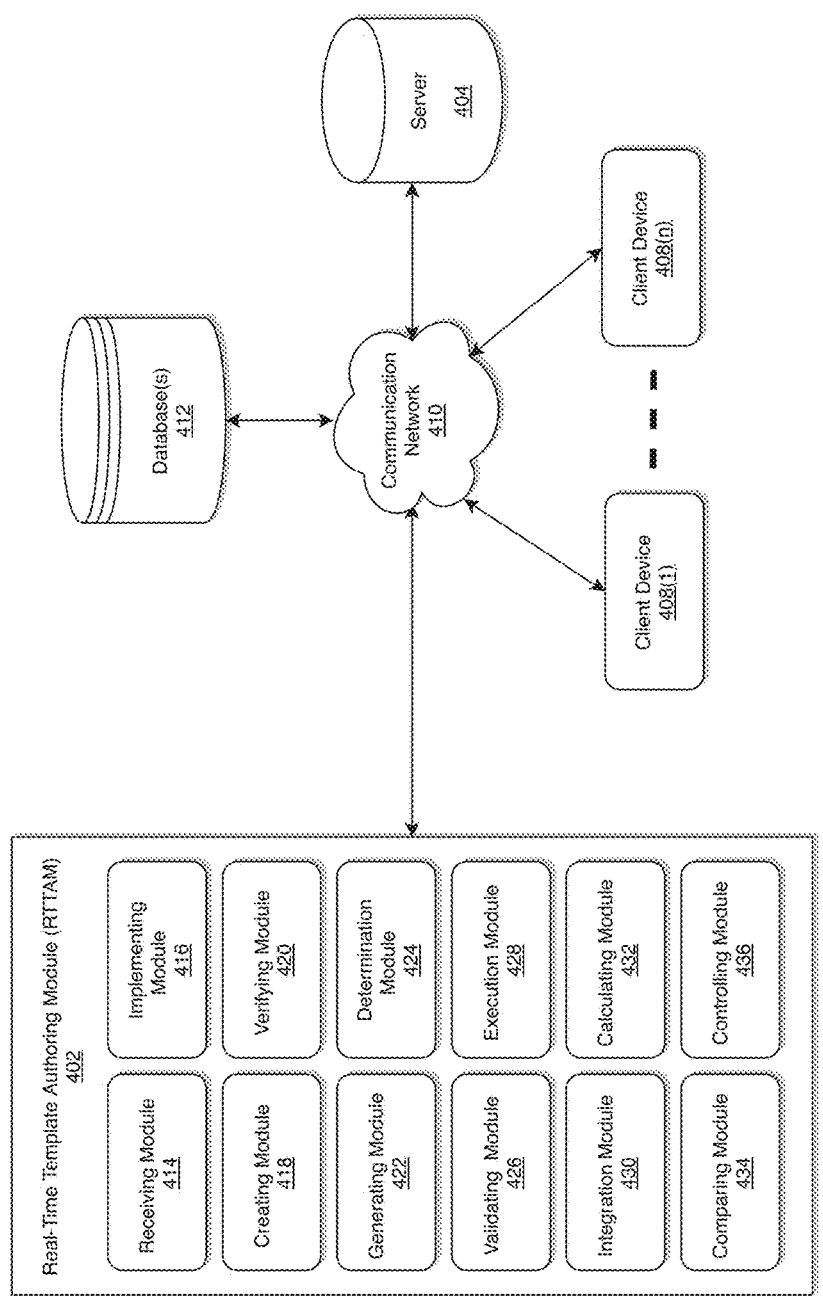
FIG. 4 illustrates a system diagram for implementing a real-time template authoring module of FIG. 3 in accordance with an exemplary embodiment.

FIG. 4 illustrates a system diagram for implementing a real-time template authoring module of FIG. 3 in accordance with an exemplary embodiment. As illustrated in FIG. 4, the system 400 may include an RTTAM 402, a database 412, a server 404, and a communication network 410.

As illustrated in FIG. 4, the RTTAM 402 may include a receiving module 414, an implementing module 416, a creating module 418, a verifying module 420, a generating module 422, a determination module 424, a validating module 426, an execution module 428, an integration module 430, a calculating module 432, a comparing module 434, a controlling module 436, and a GUI (not shown). According to exemplary embodiments, the database 412 may be external to the RTTAM 402 and may include various systems that are managed and operated by an organization. According to exemplary embodiments, the database 412 may also be an internal database managed and operated by an organization. Thus, according to an exemplary embodiment, the database 412 may be imbedded within the RTTAM 402.

The process may be executed via the communication network 410, which may comprise plural networks as described above. For example, in an exemplary embodiment, the various components of the RTTAM 402 may communicate with the server 404, the database 412, via the communication network 410. Of course, these embodiments are merely exemplary and are not limiting or exhaustive.

According to exemplary embodiments, a communication module (not shown) embedded within the RTTAM may be configured to establish a link between the database 412 via the communication network 410.

According to exemplary embodiments, each of the receiving module 414, implementing module 416, creating module 418, verifying module 420, generating module 422, determination module 424, validating module 426, execution module 428, integration module 430, calculating module 432, comparing module 434, and the controlling module 436 may be implemented by microprocessors or similar, they may be programmed using software (e.g., microcode) to perform various functions discussed herein and may optionally be driven by firmware and/or software. Alternatively, each of the receiving module 414, implementing module 416, creating module 418, verifying module 420, generating module 422, determination module 424, validating module 426, execution module 428, integration module 430, calculating module 432, comparing module 434, and the controlling module 436 may be implemented by dedicated hardware, or as a combination of dedicated hardware to perform some functions and a processor (e.g., one or more programmed microprocessors and associated circuitry) to perform other functions. Also, according to exemplary embodiments, each of the receiving module 414, implementing module 416, creating module 418, verifying module 420, generating module 422, determination module 424, validating module 426, execution module 428, integration module 430, calculating module 432, comparing module 434, and the controlling module 436 may be physically separated into two or more interacting and discrete blocks, units, devices, and/or modules without departing from the scope of the inventive concepts.

According to exemplary embodiments, the receiving module 414 may be configured to receive a request to create a real-time document template. Implementing module 416 may be configured to implement a template authoring work flow process by leveraging native tools to create the real-time document template based on the received request.

Figure 5:
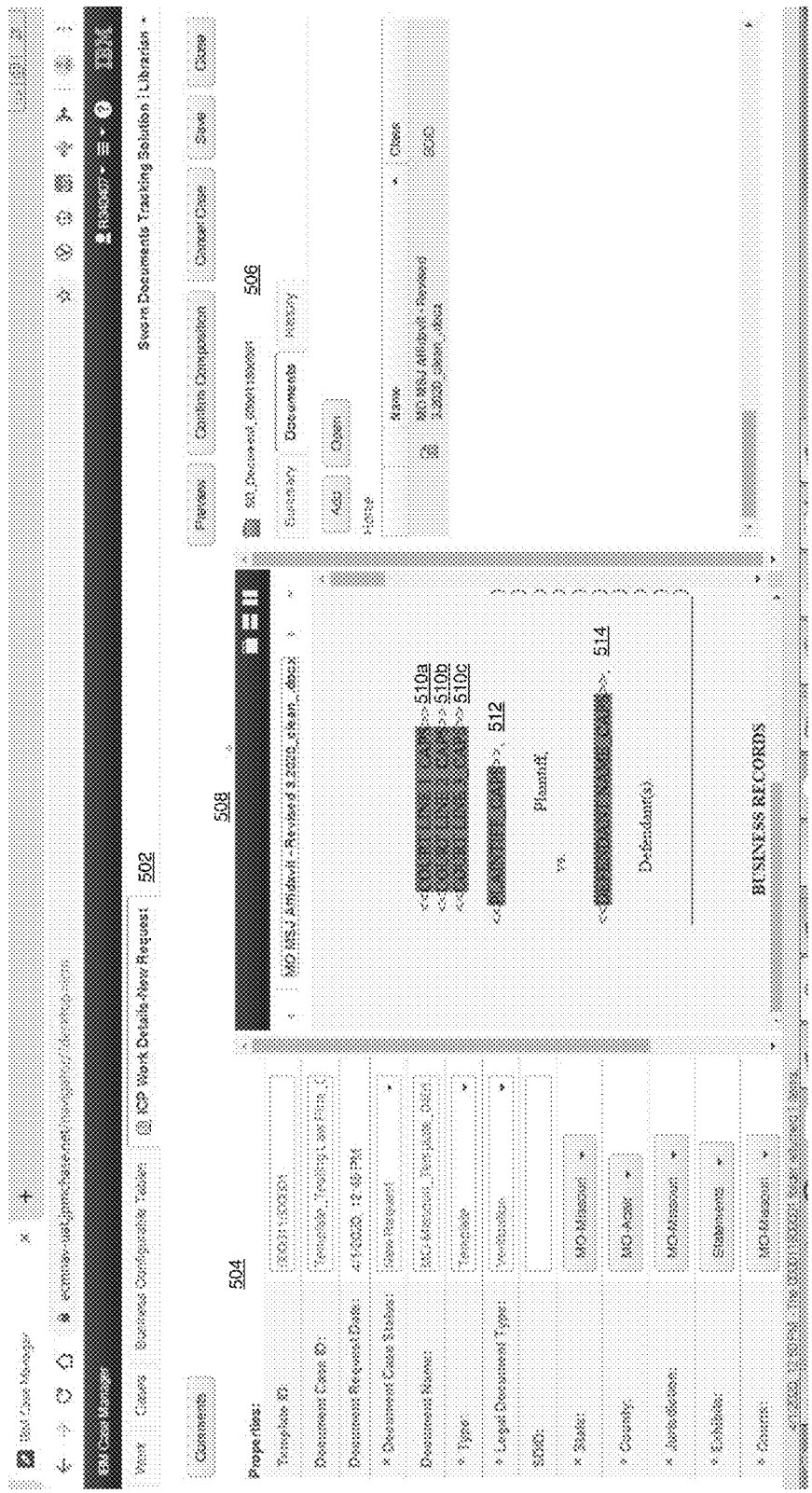
FIG. 5 illustrates an exemplary graphical user interface for creating a real-time document template in accordance with an exemplary embodiment.

For example, FIG. 5 illustrates an exemplary graphical user interface for creating a real-time document template in accordance with an exemplary embodiment. As illustrated in FIG. 5, the GUI 500 shows a tab 502 for work details-new request. When a user selects tab 502, a display window having a first window 504 for showing properties, a second window 506 showing which document to be selected, and a third window 508 showing a real-time document template created by the RTTAM 402. As illustrated in FIG. 5, the document template created by the RTTAM 402 may include, auto-fillable boxes 510a, 510b, 510c, 512, 514, etc., that will be automatically filled with content data related to a real-time document to be created based on a court case (e.g., a court case related to a litigation of a card payment defaulter). For example, in this exemplary embodiment, the first fillable box 510a may be auto-populated by the content data related to line 1 of the court case; the second fillable box 510b may be auto-populated by the content data related to line 2 of the court case; the third fillable box 510c may be auto-populated by the content data related to line 3 of the court case; the fourth fillable box 512 may be auto-populated by the name of the plaintiff of the court case; the fifth fillable box 514 may be auto-populated by the name of the defendant of the court case; but the disclosure is not limited thereto.

According to exemplary embodiments, the creating module 418 may be configured to create a real-time document based on the real-time document template as illustrated in FIG. 5.

According to exemplary embodiments, the execution module 428 may be configured to trigger an automatic verification process in response to creating the real-time document. The automatic verification process may include: verifying, by utilizing the verifying module 420, content data of the created real-time document with pre-stored reference content data by accessing the database 412 and generating, by utilizing the generating module 422, a confidence index value based on verifying the content data of the real-time document with pre-stored reference content data. According to exemplary embodiments, the confidence index value represents a degree of matching of the content data of the real-time document to the pre-stored reference content data. The automatic verification process may also include: completing the automatic verification process, by utilizing the execution module 428, when the determination module 424 determines that the confidence index value corresponds to an exact match of the content data of the real-time document to the pre-stored reference content data; and validating, by utilizing the validating module 426, the real-time document for execution after completing the automatic verification process.

According to exemplary embodiments, the RTTAM 402 may be configured to allow designing the template authoring work flow by leveraging native tools like Adobe Writer and MS word and integrated into a document tracking system (e.g., a sworn document tracking system) solution and empower the document tracking system users with right entitlements to real-time authoring of PDF and Docx templates as illustrated in FIG. 5, but the disclosure is not limited thereto.

According to exemplary embodiments. The RTTAM 402 may also be configured to allow building an intelligent self-managed place-holder data dictionary used in the template during authoring, wherein post template authoring composed the template to create PDF document and initiate legal review/approval process which will described later in details.

According to exemplary embodiments, the execution module 428 may be configured to trigger a manual quality check process to manually verify the content data of the real-time document and the pre-stored reference content data when the determination module 424 determines that the confidence index value does not correspond to an exact match of the content data of the real-time document to the pre-stored reference content data. The validating module 426 may be configured to validate the real-time document after completing the manual quality check process.

Template authoring and review/approval process may be time consuming process. However, to ensure that productivity is not lost by initiating a new duplicate process, the RTTAM 402 may be configured to calculate hash value of the template content and store this information in the database 412. Before initiating new template authoring work flow process, the RTTAM may be configured to validate the hash value of the new template request.

For example, the calculating module 432 may calculate a hash value of template content of the created template and store the hash value onto the database 412. The receiving module 414 may receive a request for creating a new real-time document template. The calculating module may calculate a hash value of the new real-time document template request. The comparing module 434 may compare the hash value of the new real-time document template request with the stored hash value by accessing the database 412. The generating module 422 may generate a positive validation result of validating the hash value of the new real-time document template request when the determination module 424 determines that the hash value of the new real-time document template request is different from the stored hash value and the execution module 428 may initiate a new template authoring work flow process to create the new real-time document template based on the positive validation result.

According to exemplary embodiments, the generating module 422 may generate a negative validation result of not validating the hash value of the new real-time document template request when the determination module 424 determines that the hash value of the new real-time document template request is the same as the stored hash value and the execution module 428 may reject the request to create the new real-time document template based on the negative validation result. According to exemplary embodiments, the user may be presented with the already stored real-time document template when the request to create the new real-time document template is rejected.

According to exemplary embodiments, the real-time document may be a sworn document requiring execution by an authorized user after validation, but the disclosure is not limited thereto.

According to exemplary embodiments, the real-time document template may be in .pdf and/or .docx file format, but the disclosure is not limited thereto.

According to exemplary embodiments, the RTTAM 402 may be configured to allow designing and building composition services leveraging third-party APIs (e.g., Aspose) to compose the templates that is in PDF and MS Word format. By leveraging Aspose APIs and services from Captive, the RTTAM 402 are able to build plethora of document content management capabilities and integrate into document tracking system solution. According to exemplary embodiments, real-time composition of documents from the data in document tracking system cases and card services system which is the system of record for evidence at the time of verification of the case.

According to exemplary embodiments, the controlling module 436 may be configured to implement auto quality control functionality where the comparing module 434 of the system (i.e., RTTAM 402) compares around 100 fields between case fields and the system of record like card services, and based on success rate, the system takes the decision to auto complete the quality check process or trigger a manual quality check process. According to exemplary embodiments, the RTTAM 402 may leverage Captiva OCR extraction service and Aspose APIs to implement the quality control functionality.

According to exemplary embodiments, systemic validation of document tracking system case/account information against card services information mainframe screens ensures that a signer (who executes a sworn document created by the RTTAM 402) have done the verification process. The RTTAM 402 may allow integrating third-party solution like ZFE Emulator with the document tracking system to launch mainframe screen to populate account information in the context of the document tracking system screens. This solution effected by the RTTAM 402 may enable the signer to systematically complete verification process without leaving the document tracking system web application (see e.g., FIGS. 6-11).

Figure 6:
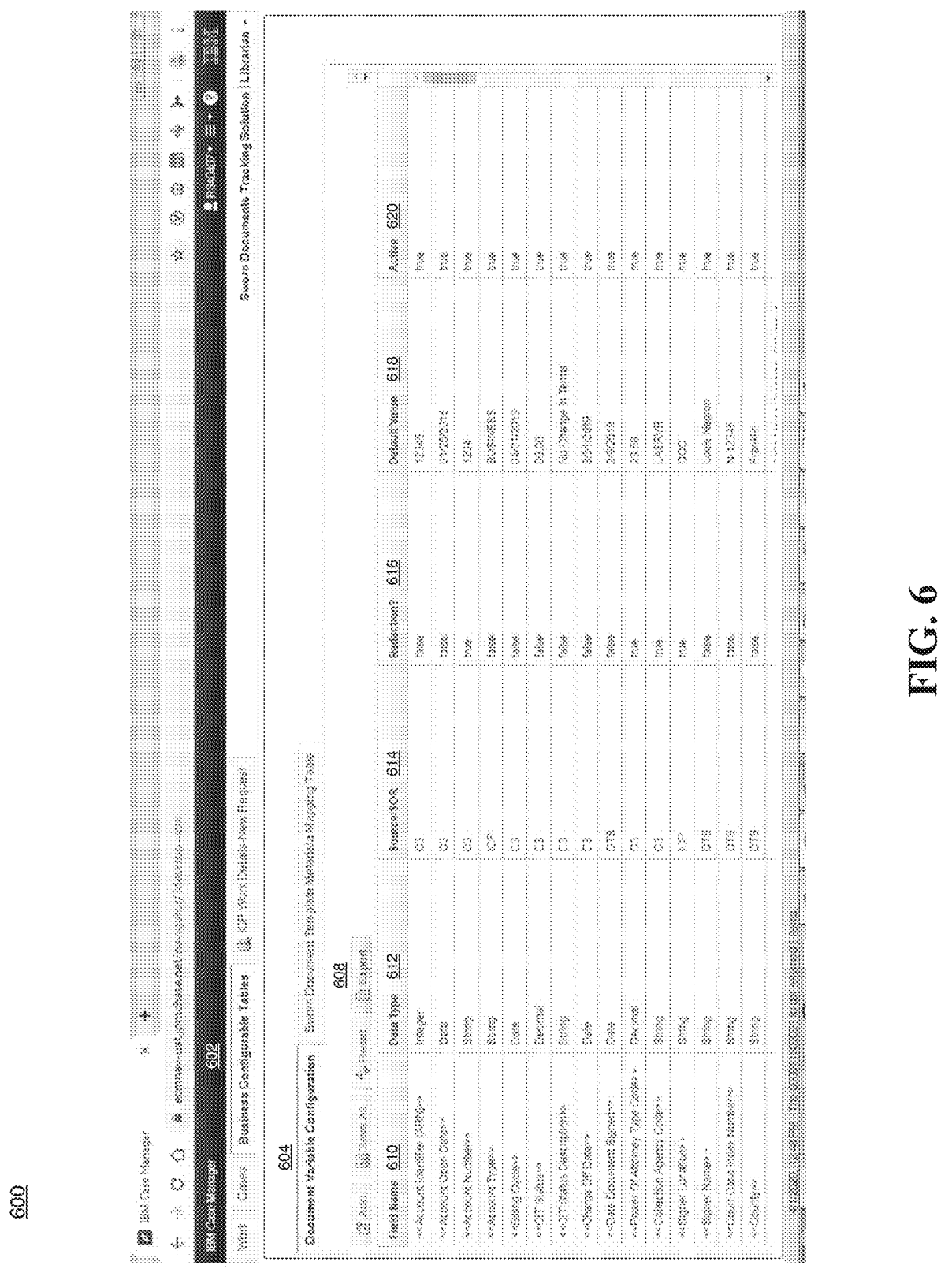

FIG. 6 illustrates an exemplary configurable table in creating a real-time document template in accordance with an exemplary embodiment. As illustrated in FIG. 6, the GUI 600 illustrates a business configuration table that drivers the population of variable fields/tags in the authored document—Authoring of Templates. For example, the document variable configuration table 604 may include a tab for add, a tab for save all, a tab for reset and a tab for export 608, but the disclosure is not limited thereto. The document variable configuration table 604 may also include a column for field name 610, a column for data type 612, a column for source/SOR 614, a column for redaction 616, a column for default value 618, and a column for active 620, but the disclosure is not limited thereto.

Figure 7:
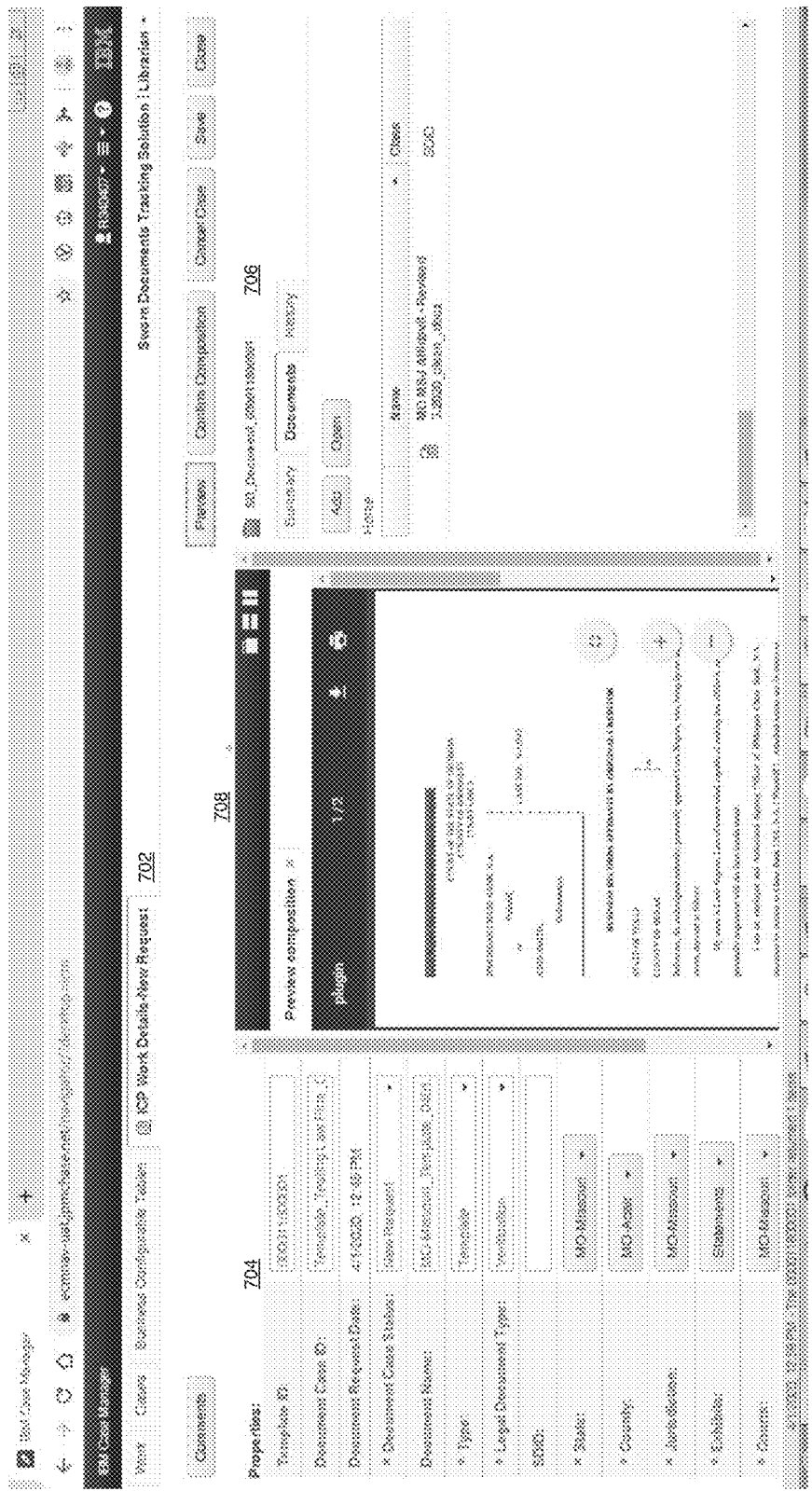
FIG. 7 illustrates an exemplary real-time preview of composed in accordance with an exemplary embodiment.

FIG. 7 illustrates an exemplary real-time preview of composed in accordance with an exemplary embodiment. As illustrated in FIG. 7, the GUI 700 illustrates a window for ICP work details-new request tab 702. Upon selection of the ICP work details-new request tab 702, the GUI 700 may display a first window 706 which may include a tab for preview, a tab for confirming composition, a tab for cancel case, a tab for save, and a tab for close, but the disclosure is not limited thereto. As illustrated in FIG. 7, the GUI 700 illustrates real-time preview of composed in accordance with an exemplary embodiment in which properties are illustrated in a second window 704, and a preview composition is illustrated in a third window 708. Referring to FIGS. 5 and 7, the first fillable box 510a has been auto-populated by the content data related to line 1 of the court case, i.e., COURT OF THE STATE OF GEORGIA; the second fillable box 510b has been auto-populated by the content data related to line 2 of the court case, i.e., COUNTY OF GWINNETT; the third fillable box 510c has been be auto-populated by the content data related to line 3 of the court case (in this example, since there were no content data in court line 3, the field content COURT LINE 3 from FIG. 5 has been reproduced in this field of the created real-time document as illustrated in FIG. 7); the fourth fillable box 512 has been auto-populated by the name of the plaintiff of the court case, i.e., JPMORGAN AND CHASE BANK, N.A.; and the fifth fillable box 514 has been auto-populated by the name of the defendant of the court case, i.e., JOHN SMITH; but the disclosure is not limited thereto.

Figure 8:
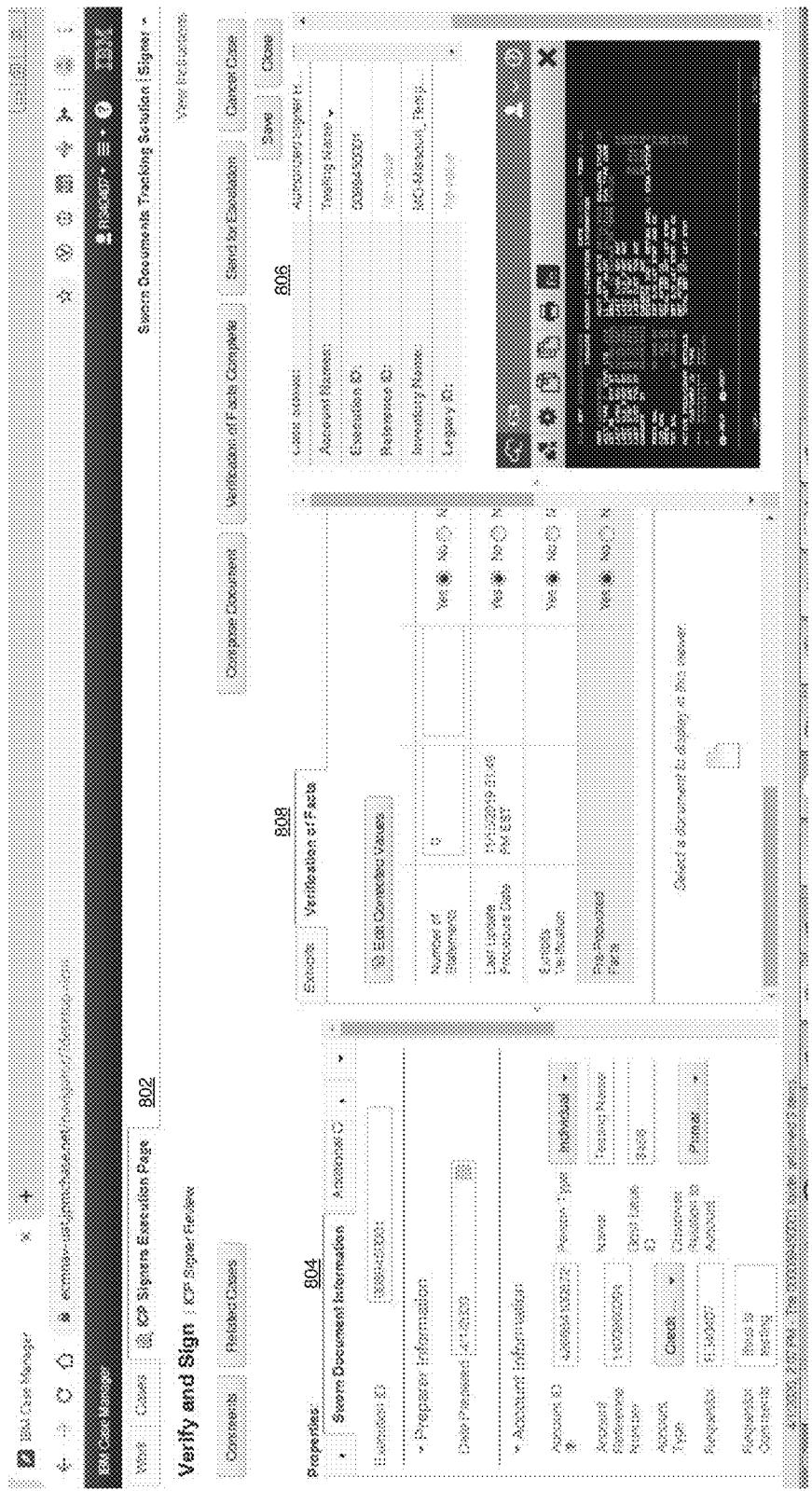
FIG. 8 illustrates an exemplary graphical user interface for verification and execution of a real-time document in accordance with an exemplary embodiment.

FIG. 8 illustrates an exemplary graphical user interface for verification and execution of a real-time document in accordance with an exemplary embodiment. The GUI 800 illustrates a window 806 where a user may select a tab for composing document, a tab for indicating that verification of facts has been completed, a tab for sending for escalation, a tab for canceling the case, a tab for save, and a tab for close, but the disclosure is not limited thereto. As illustrated in FIG. 8, the GUI 800 may display an ICP signers execution page tab 802, a sworn document information tab 804 and a verification of facts tab 808, but the disclosure is not limited thereto.

Figure 9:
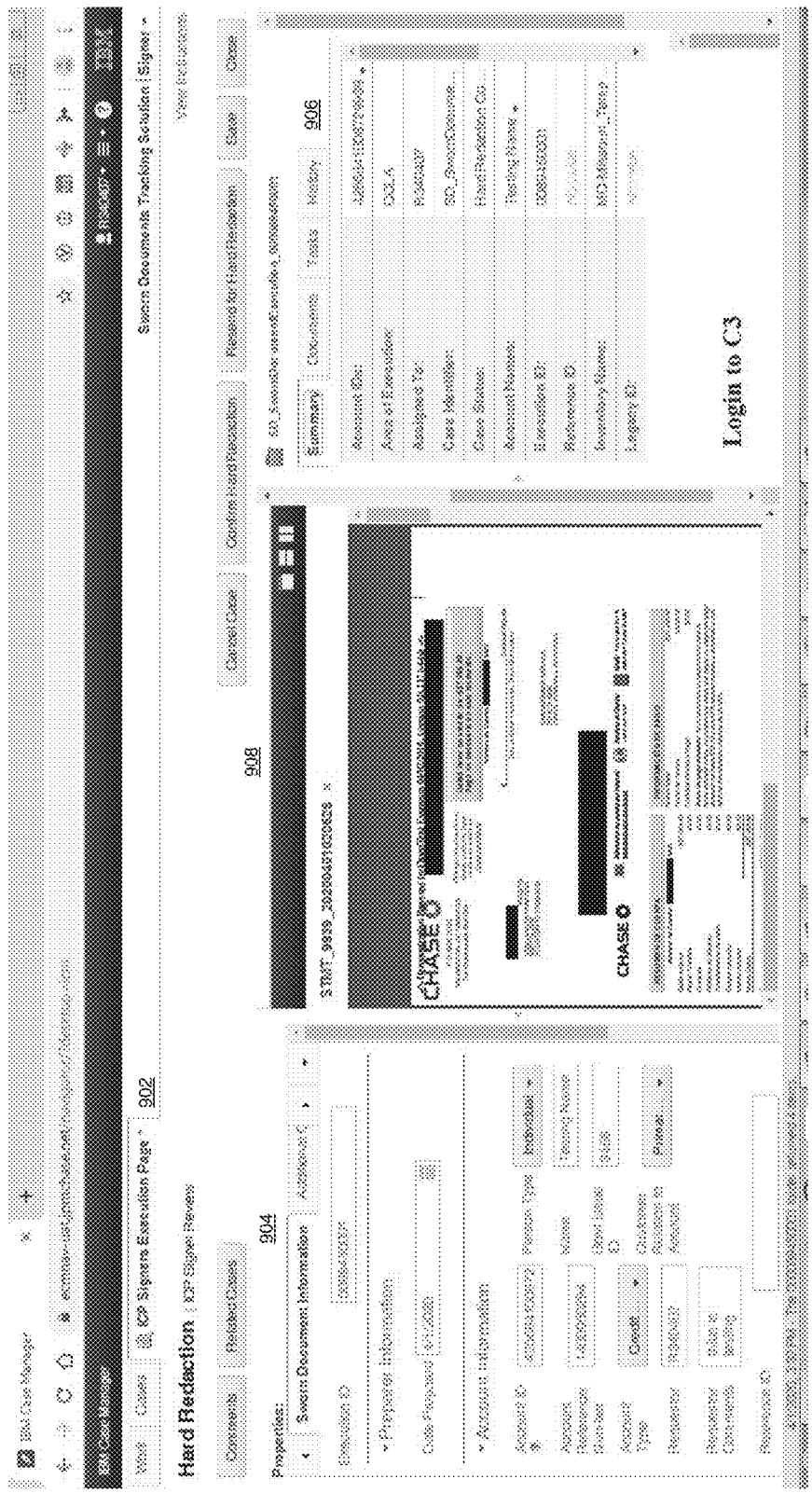
FIG. 9 illustrates an exemplary graphical user interface for hard redaction in accordance with an exemplary embodiment.

FIG. 9 illustrates an exemplary graphical user interface for hard redaction in accordance with an exemplary embodiment. The GUI 900 illustrates a window 906 where a user may select a tab for canceling case, a tab for confirming hard redaction, a tab for resending for hard redaction, a tab for save, and a tab for close, but the disclosure is not limited thereto. As illustrated in FIG. 9, the GUI 900 may display an ICP signers execution page tab 902, a sworn document information tab 904 and a window 908 displaying hard redaction, but the disclosure is not limited thereto.

Figure 10:
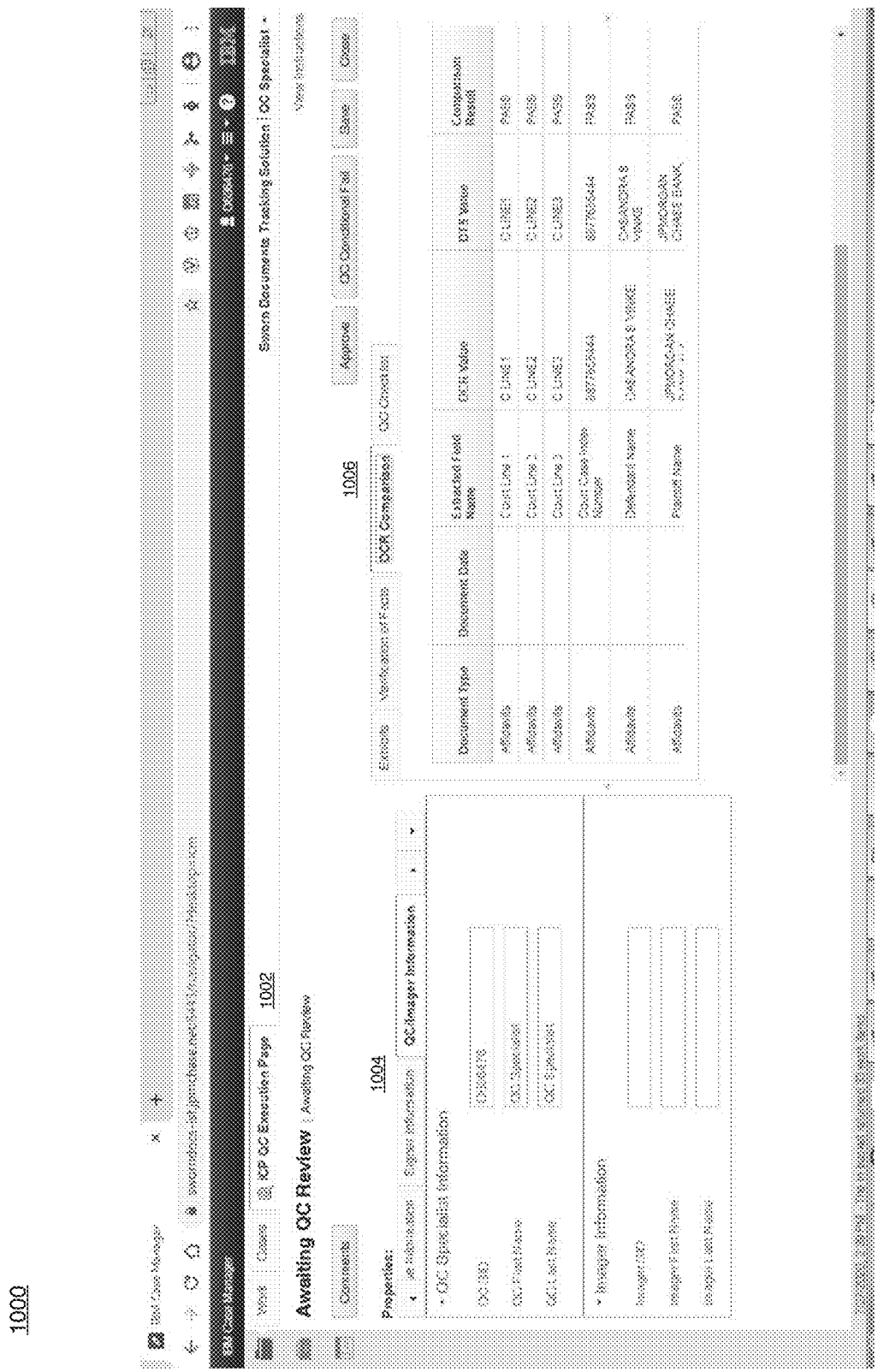
FIG. 10 illustrates an exemplary graphical user interface for quality check in accordance with an exemplary embodiment.

FIG. 10 illustrates an exemplary graphical user interface for quality check in accordance with an exemplary embodiment. The GUI 1000 illustrates a window 1006 where a user may select a tab for approve, a tab for quality control (QC) conditional fail, a tab for save, and a tab for close, but the disclosure is not limited thereto. As illustrated in FIG. 10, the GUI 1000 may display an ICP QC execution page tab 1002, a window 1004 where a tab for QC/imager information is illustrated and a window 1006 where a tab for OCR Comparison is illustrated, but the disclosure is not limited thereto.

Figure 11:
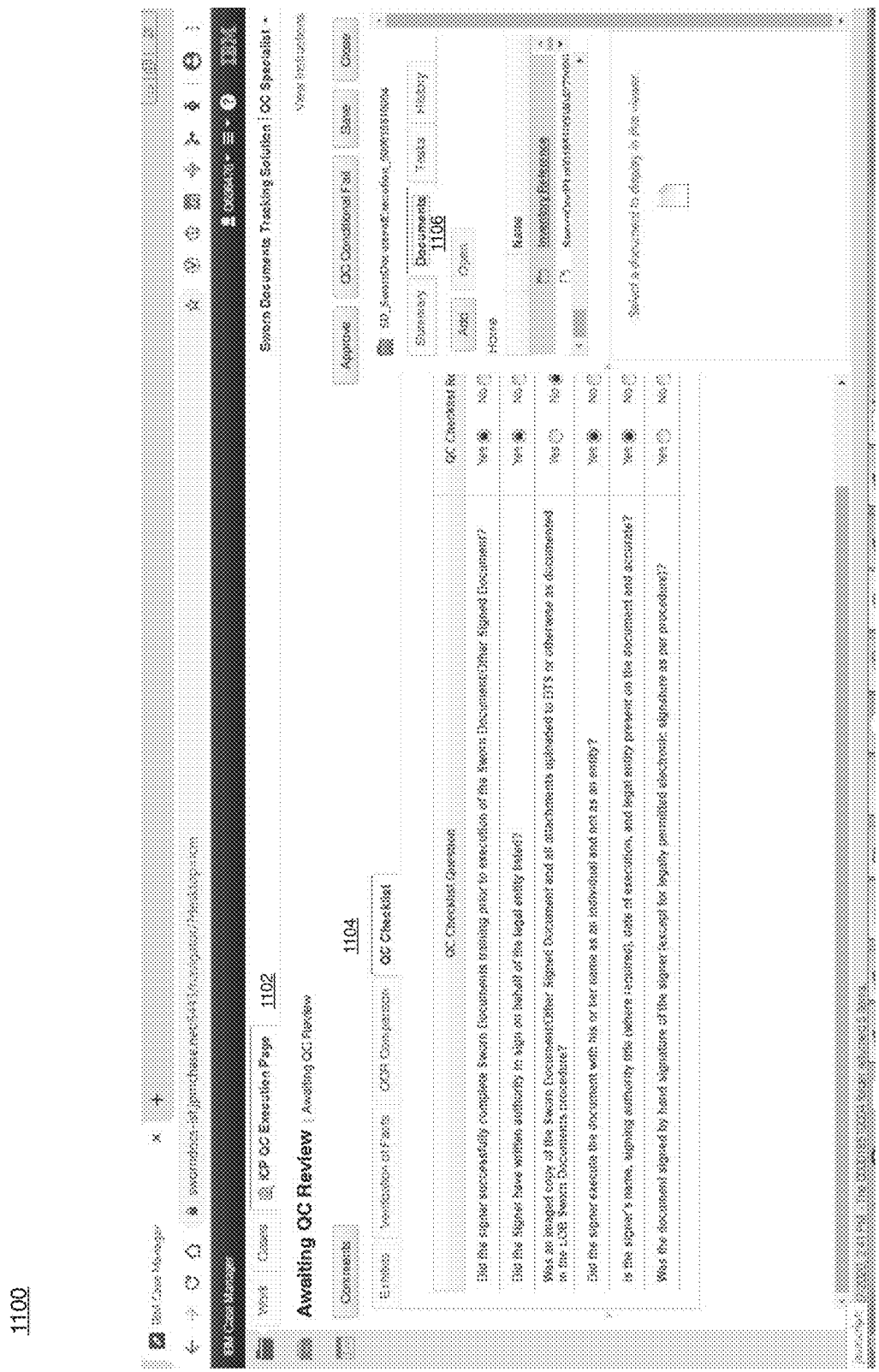
FIG. 11 illustrates an exemplary quality control check-list in accordance with an exemplary embodiment.

FIG. 11 illustrates an exemplary quality control check-list in accordance with an exemplary embodiment. The GUI 1100 illustrates a window 1106 where a user may select a tab for approve, a tab for quality control (QC) conditional fail, a tab for save, and a tab for close, but the disclosure is not limited thereto. As illustrated in FIG. 11, the GUI 1100 may display an ICP QC execution page tab 1102, a window 1104 where a tab for QC checklist 1104 is illustrated and a window 1106 where a tab for documents is illustrated, but the disclosure is not limited thereto.

Referring back to FIG. 4, according to exemplary embodiments, the integration module 430 may be configured to integrate the template authoring workflow process into a system that is configured to track and manage sworn documents across multiple lines of business (LOB). The integration module 430 may also be configured to integrate mainframe screens into the system; and automatically populate account information based on an account that a user log in information into the system.

According to exemplary embodiments, the creating module 418 may be configured to build an intelligent self-managed place-holder data dictionary used in the real-time document template during authoring of the real-time document template.

According to exemplary embodiments, the template authoring work flow process may provide real-time document management capabilities that may include one or more of the following document-based capabilities: composition, extraction, soft redaction, hard redaction, splitting or merging of pages, document packaging, and bar coding, as illustrated with respect to FIGS. 3-11, but the disclosure is not limited thereto.

According to exemplary embodiments, the implementing module 416 may be configured to implement an optical character recognition (OCR) processing and application programming interfaces (APIs) for document generation, conversion, and automation; and the controlling module 436 may be configured to automatically control quality of the created real-time document based on the OCR processing and the APIs.

According to exemplary embodiments, a non-transitory computer readable medium may be configured to store instructions for implementing the RTTAM 402 for real-time template authoring and execution. According to exemplary embodiments, the instructions, when executed, may cause a processor embedded within the RTTAM 302 or the RTTAM 402 to perform the following: causing a receiver to receive a request to create a real-time document template; implementing a template authoring work flow process by leveraging native tools to create the real-time document template based on the received request; creating a real-time document based on the real-time document template; triggering an automatic verification process in response to creating the real-time document, wherein the automatic verification process includes: verifying content data of the created real-time document with pre-stored reference content data; generating a confidence index value based on verifying the content data of the real-time document with pre-stored reference content data, wherein the confidence index value represents a degree of matching of the content data of the real-time document to the pre-stored reference content data; and completing the automatic verification process when it is determined that the confidence index value corresponds to an exact match of the content data of the real-time document to the pre-stored reference content data; and validating the real-time document for execution after completing the automatic verification process. The processor may be the same or similar to the processor 104 as illustrated in FIG. 1 or the processor embedded within RTTAM 202, RTTAM 302, and RTTAM 402.

According to exemplary embodiments, the instructions, when executed, may further cause the processor 104 to perform the following prior to matching: triggering a manual quality check process to manually verify the content data of the real-time document and the pre-stored reference content data when it is determined that the confidence index value does not correspond to an exact match of the content data of the real-time document to the pre-stored reference content data; and validating the real-time document after completing the manual quality check process.

According to exemplary embodiments, the instructions, when executed, may further cause the processor 104 to perform the following: integrating the template authoring workflow process into a system that is configured to track and manage sworn documents across multiple lines of business (LOB).

According to exemplary embodiments, the instructions, when executed, may further cause the processor 104 to perform the following: integrating mainframe screens into the system; and automatically populating account information based on an account that a user log in information into the system.

According to exemplary embodiments, the instructions, when executed, may further cause the processor 104 to perform the following: building an intelligent self-managed place-holder data dictionary used in the real-time document template during authoring of the real-time document template.

According to exemplary embodiments, the instructions, when executed, may further cause the processor 104 to perform the following: calculating a hash value of template content of the created template; storing the hash value onto a database; receiving a request for creating a new real-time document template; calculating a hash value of the new real-time document template request; comparing the hash value of the new real-time document template request with the stored hash value by accessing the database; generating a positive validation result of validating the hash value of the new real-time document template request when it is determined that the hash value of the new real-time document template request is different from the stored hash value; and initiating a new template authoring work flow process to create the new real-time document template based on the positive validation result.

According to exemplary embodiments, the instructions, when executed, may further cause the processor 104 to perform the following: calculating a hash value of template content of the created template; storing the hash value onto a database; receiving a request for creating a new real-time document template; calculating a hash value of the new real-time document template request; comparing the hash value of the new real-time document template request with the stored hash value by accessing the database; generating a negative validation result of not validating the hash value of the new real-time document template request when it is determined that the hash value of the new real-time document template request is the same as the stored hash value, and rejecting the request to create the new real-time document template based on the negative validation result.

According to exemplary embodiments, the instructions, when executed, may further cause the processor 104 to perform the following: implementing an optical character recognition (OCR) processing and application programming interfaces (APIs) for document generation, conversion, and automation; and automatically controlling quality of the created real-time document based on the OCR processing and the APIs.

Figure 12:
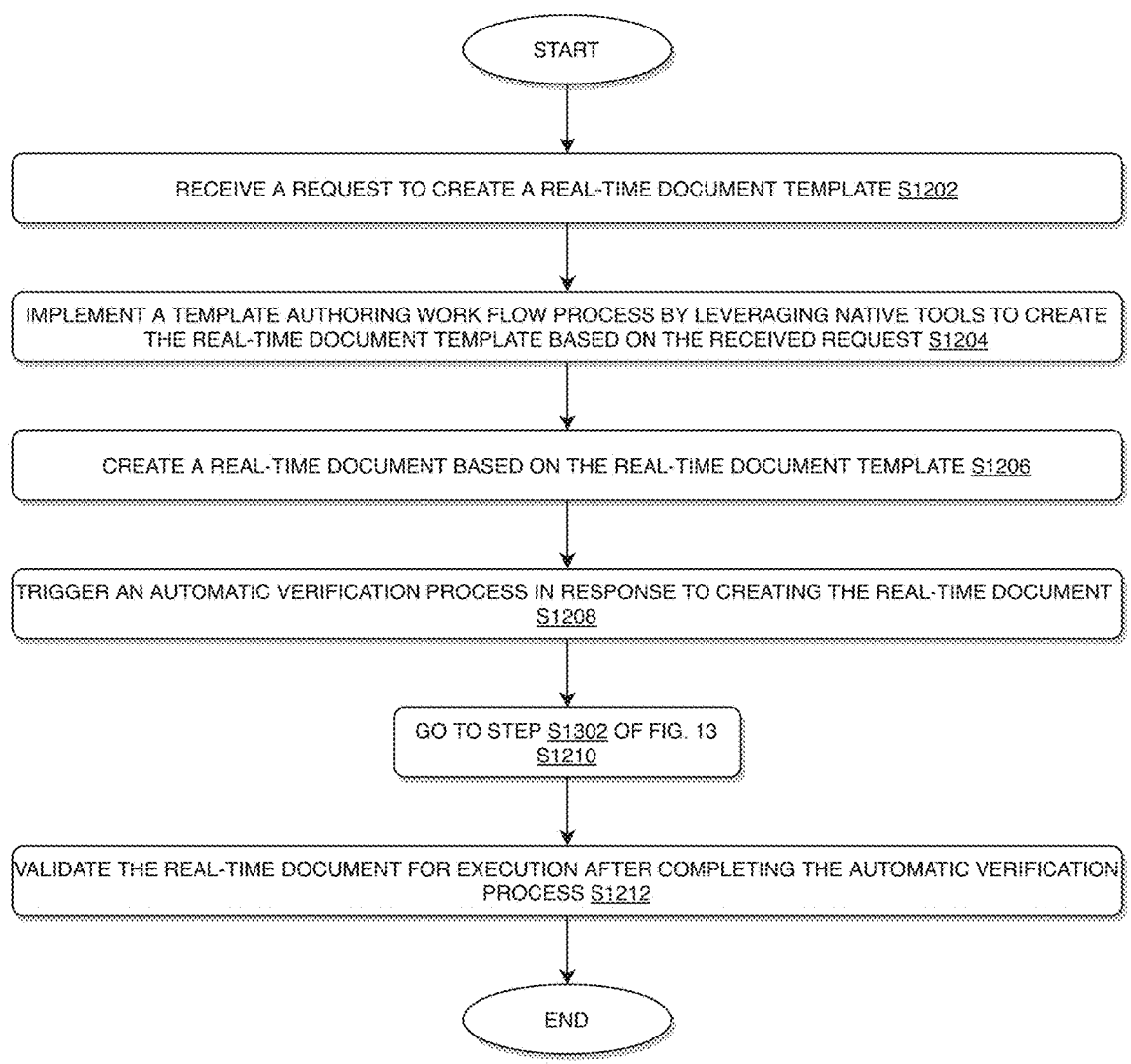
FIG. 12 illustrates a flow diagram for real-time template authoring and execution in accordance with an exemplary embodiment.

FIG. 12 illustrates a flow diagram for real-time template authoring and execution in accordance with an exemplary embodiment.

In the process 1200 of FIG. 12, at step S1202, a receiver may receive a request to create a real-time document template. At step S1204, a template authoring work flow process may be implemented by leveraging native tools to create the real-time document template based on the received request. At step S1206, a real-time document may be created based on the real-time document template. At step S1208, an automatic verification process may be triggered in response to creating the real-time document.

Figure 13:
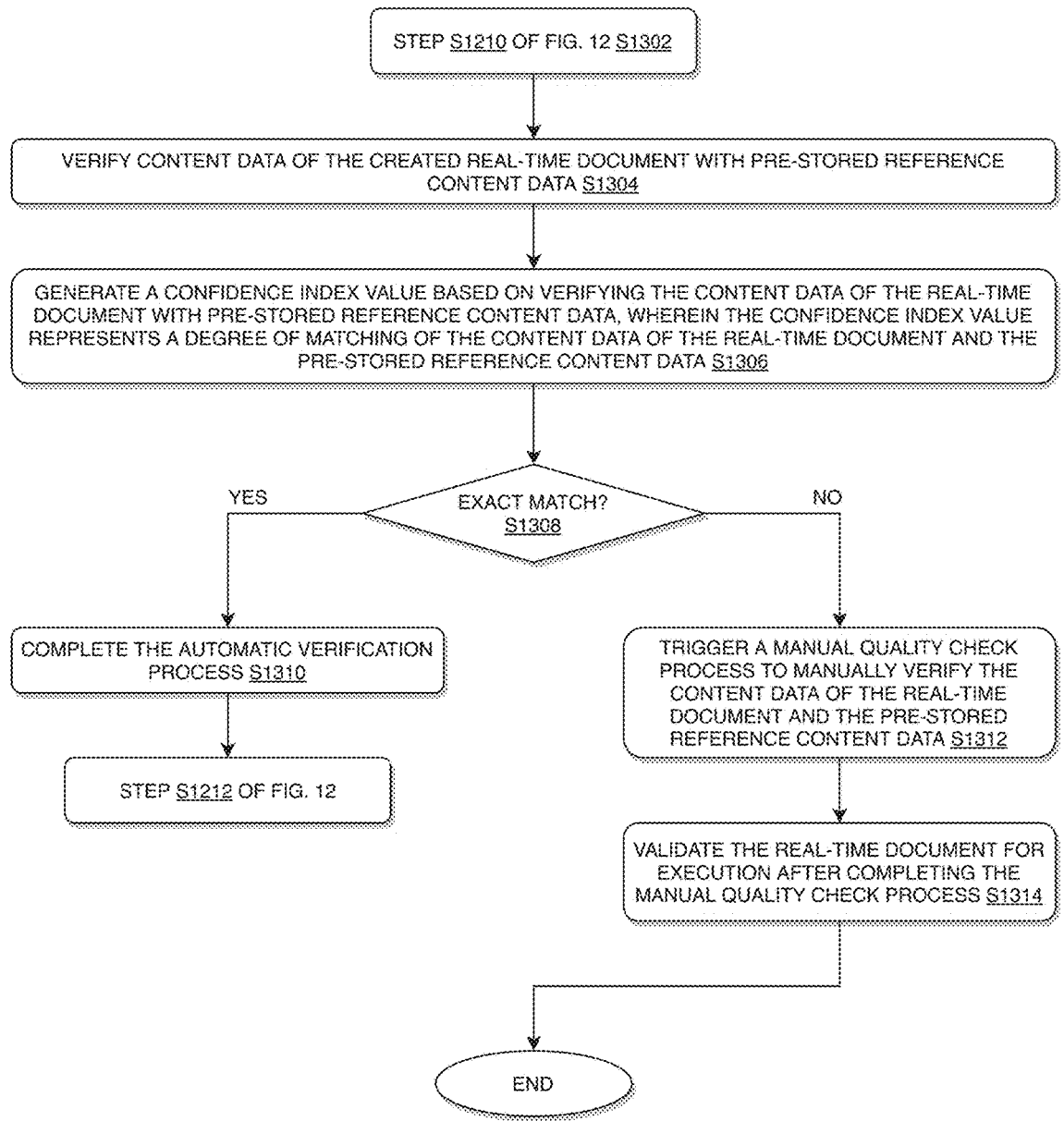
FIG. 13 illustrates another flow diagram for real-time template authoring and execution in accordance with an exemplary embodiment.

FIG. 13 illustrates an exemplary flow diagram of the automatic verification process of FIG. 12 in accordance with an exemplary embodiment.

For example, at step Sf302, the process 1300 triggers the automatic verification process S1210 of FIG. 12. At step 1304, content data of the created real-time document may be verified with pre-stored reference content data. At step S1306, a confidence index value may be generated based on verifying the content data of the real-time document with pre-stored reference content data. The confidence index value may represent a degree of matching of the content data of the real-time document to the pre-stored reference content data.

At step S1308 of the process 1300 of FIG. 13, it is determined whether the confidence index value corresponds to an exact match of the content data of the real-time document to the pre-stored reference content data. At step S1310, the automatic verification process is completed when it is determined that the confidence index value corresponds to an exact match of the content data of the real-time document to the pre-stored reference content data and the process 1300 proceed to step S1212 of FIG. 12 where the real-time document is validated for execution after completing the automatic verification process.

According to exemplary embodiments, at step S1312 of FIG. 13, a manual quality check process is triggered to manually verify the content data of the real-time document and the pre-stored reference content data when it is determined in step S1308 that the confidence index value does not correspond to an exact match of the content data of the real-time document to the pre-stored reference content data. At step S1314, the real-time document may be validated for execution after completing the manual quality check process.

According to exemplary embodiments, the process 1200 may further perform the following: integrating the template authoring workflow process into a system that is configured to track and manage sworn documents across multiple lines of business (LOB).

According to exemplary embodiments, the process 1200 may further perform the following: integrating mainframe screens into the system; and automatically populating account information based on an account that a user log in information into the system.

According to exemplary embodiments, the process 1200 may further perform the following: building an intelligent self-managed place-holder data dictionary used in the real-time document template during authoring of the real-time document template.

According to exemplary embodiments, the process 1200 may further perform the following: calculating a hash value of template content of the created template; storing the hash value onto a database; receiving a request for creating a new real-time document template; calculating a hash value of the new real-time document template request; comparing the hash value of the new real-time document template request with the stored hash value by accessing the database; generating a positive validation result of validating the hash value of the new real-time document template request when it is determined that the hash value of the new real-time document template request is different from the stored hash value; and initiating a new template authoring work flow process to create the new real-time document template based on the positive validation result.

According to exemplary embodiments, the process 1200 may further perform the following: calculating a hash value of template content of the created template; storing the hash value onto a database; receiving a request for creating a new real-time document template; calculating a hash value of the new real-time document template request; comparing the hash value of the new real-time document template request with the stored hash value by accessing the database; generating a negative validation result of not validating the hash value of the new real-time document template request when it is determined that the hash value of the new real-time document template request is the same as the stored hash value; and rejecting the request to create the new real-time document template based on the negative validation result.

According to exemplary embodiments, the process 1200 may further perform the following: implementing an optical character recognition (OCR) processing and application programming interfaces (APIs) for document generation, conversion, and automation; and automatically controlling quality of the created real-time document based on the OCR processing and the APIs.

According to exemplary embodiments as disclosed above in FIGS. 1-13, technical improvements effected by the instant disclosure may include platforms for implementing a real-time template authoring module for providing a true real-time end-to-end document life-cycle management solution allowing real-time template composition, real-time document manipulation, automatic quality control, etc., thereby improving timeliness, completeness, and accuracy of generating a real-time document (e.g., a sworn document), but the disclosure is not limited thereto. In addition, according to exemplary embodiments as disclosed above in FIGS. 1-13, technical improvements effected by the instant disclosure may include platforms for implementing a real-time template authoring module for supporting: real-time inventory template authoring and legal review/approval process; rejecting duplicate template authoring for productivity management; real-time template composition; real-time document manipulation capabilities such as composition, extraction, soft redaction, hard redaction, sworn document packaging/merging multiple documents, bar-coding; systemically capturing evidence as a PDF document for verification of facts; automatic quality checking; etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for real-time template authoring and execution by utilizing one or more processors and one or more memories, the method comprising:
   receiving a request to create a real-time document template;
   implementing a template authoring work flow process by leveraging native tools to create the real-time document template based on the received request;
   calculating a hash value of template content of the created template;
   storing the hash value onto a database;
   receiving a request for creating a new real-time document template;
   calculating a hash value of the new real-time document template request;
   comparing the hash value of the new real-time document template request with the stored hash value by accessing the database;
   generating a positive validation result of validating the hash value of the new real-time document template request when it is determined that the hash value of the new real-time document template request is different from the stored hash value;
   initiating a new template authoring work flow process to create the new real-time document template based on the positive validation result;
   creating a real-time document based on the real-time document template;
   triggering an automatic verification process in response to creating the real-time document, wherein the automatic verification process includes:
      verifying content data of the created real-time document with pre-stored reference content data;
      generating a confidence index value based on verifying the content data of the real-time document with pre-stored reference content data, wherein the confidence index value represents a degree of matching of the content data of the real-time document to the pre-stored reference content data; and
      completing the automatic verification process when it is determined that the confidence index value corresponds to an exact match of the content data of the real-time document to the pre-stored reference content data; and
   validating the real-time document for execution after completing the automatic verification process.

2. The method according to claim 1, further comprising: triggering a manual quality check process to manually verify the content data of the real-time document and the pre-stored reference content data when it is determined that the confidence index value does not correspond to an exact match of the content data of the real-time document to the pre-stored reference content data; and validating the real-time document for execution after completing the manual quality check process.

3. The method according to claim 1, wherein the real-time document is a sworn document requiring execution by an authorized user after validation.

4. The method according to claim 1, wherein the real-time document template is in .pdf and/or .docx the format.

5. The method according to claim 1, further comprising: integrating the template authoring workflow process into a system that is configured to track and manage sworn documents across multiple lines of business (LOB).

6. The method according to claim 5, further comprising: integrating mainframe screens into the system; and automatically populating account information based on an account that a user log in information into the system.

7. The method according to claim 1, further comprising: building an intelligent self-managed place-holder data dictionary used in the real-time document template during authoring of the real-time document template.

8. The method according to claim 1, further comprising:
generating a negative validation result of not validating the hash value of the new real-time document template request when it is determined that the hash value of the new real-time document template request is the same as the stored hash value; and
rejecting the request to create the new real-time document template based on the negative validation result.

9. The method according to claim 1, wherein the template authoring work flow process provides real-time document management capabilities that includes one or more of the following document-based capabilities: composition, extraction, soft redaction, hard redaction, splitting or merging of pages, document packaging, and bar coding.

10. The method according to claim 1, further comprising: implementing an optical character recognition (OCR) processing and application programming interfaces (APIs) for document generation, conversion, and automation; and automatically controlling quality of the created real-time document based on the OCR processing and the APIs.

11. A system for real-time template authoring and execution, comprising:
a receiver configured to receive a request to create a real-time document template;
a processor; and
a database operatively connected to the processor and the receiver via a communication network,
wherein the processor is configured to:
implement a template authoring work flow process by leveraging native tools to create the real-time document template based on the received request;
calculate a hash value of template content of the created template;
store the hash value onto a database;
receive a request for creating a new real-time document template;
calculate a hash value of the new real-time document template request;
compare the hash value of the new real-time document template request with the stored hash value by accessing the database;
generate a positive validation result of validating the hash value of the new real-time document template request when it is determined that the hash value of the new real-time document template request is different from the stored hash value;
initiate a new template authoring work flow process to create the new real-time document template based on the positive validation result;
create a real-time document based on the real-time document template;
trigger an automatic verification process in response to creating the real-time document, wherein the automatic verification process includes:
verifying content data of the created real-time document with pre-stored reference content data;
generating a confidence index value based on verifying the content data of the real-time document with pre-stored reference content data, wherein the confidence index value represents a degree of matching of the content data of the real-time document to the pre-stored reference content data; and
completing the automatic verification process when it is determined that the confidence index value corresponds to an exact match of the content data of the real-time document to the pre-stored reference content data; and
validate the real-time document for execution after completing the automatic verification process.

12. The system according to claim 11; wherein the processor is further configured to: trigger a manual quality check process to manually verify the content data of the real-time document and the pre-stored reference content data when it is determined that the confidence index value does not correspond to an exact match of the content data of the real-time document to the pre-stored reference content data; and validate the real-time document for execution after completing the manual quality check process.

13. The system according to claim 11, wherein the processor is further configured to: integrate the template authoring workflow process into a system that is configured to track and manage sworn documents across multiple lines of business (LOB).

14. The system according to claim 13, wherein the processor is further configured to: integrate mainframe screens into the system; and automatically populate account information based on an account that a user log in information into the system.

15. The system according to claim 11; wherein the processor is further configured to: build an intelligent self-managed place-holder data dictionary used in the real-time document template during authoring of the real-time document template.

16. The system according to claim 11, wherein the processor is further configured to:
generate a negative validation result of not validating the hash value of the new real-time document template request when it is determined that the hash value of the new real-time document template request is the same as the stored hash value; and
reject the request to create the new real-time document template based on the negative validation result.

17. The system according to claim 11, wherein the processor is further configured to: implement an optical character recognition (OCR) processing and application programming interfaces (APIs) for document generation, conversion, and automation; and automatically control quality of the created real-time document based on the OCR processing and the APIs.

18. A non-transitory computer readable medium configured to store instructions for real-time template authoring and execution, wherein when executed, the instructions cause a processor to perform the following:
causing a receiver to receive a request to create a real-time document template;
implementing a template authoring work flow process by leveraging native tools to create the real-time document template based on the received request;
calculating a hash value of template content of the created template;
storing the hash value onto a database;
receiving a request for creating a new real-time document template;
calculating a hash value of the new real-time document template request;

comparing the hash value of the new real-time document template request with the stored hash value by accessing the database;
generating a positive validation result of validating the hash value of the new real-time document template request when it is determined that the hash value of the new real-time document template request is different from the stored hash value;
initiating a new template authoring work flow process to create the new real-time document template based on the positive validation result;
creating a real-time document based on the real-time document template;
triggering an automatic verification process in response to creating the real-time document, wherein the automatic verification process includes:
  verifying content data of the created real-time document with pre-stored reference content data;
  generating a confidence index value based on verifying the content data of the real-time document with pre-stored reference content data, wherein the confidence index value represents a degree of matching of the content data of the real-time document to the pre-stored reference content data; and
  completing the automatic verification process when it is determined that the confidence index value corresponds to an exact match of the content data of the real-time document to the pre-stored reference content data; and
validating the real-time document for execution after completing the automatic verification process.

* * * * *